US008219490B2

(12) United States Patent
Hammad et al.

(10) Patent No.: US 8,219,490 B2
(45) Date of Patent: Jul. 10, 2012

(54) PAYMENT TRANSACTION USING MOBILE PHONE AS RELAY

(75) Inventors: Ayman Hammad, Pleasanton, CA (US); Patrick Faith, Pleasanton, CA (US)

(73) Assignee: Visa U.S.A., Inc., San Francisco, CA (US)

( * ) Notice: Subject to any disclaimer, the term of this patent is extended or adjusted under 35 U.S.C. 154(b) by 410 days.

(21) Appl. No.: 12/257,958

(22) Filed: Oct. 24, 2008

(65) Prior Publication Data

US 2009/0112768 A1 Apr. 30, 2009

Related U.S. Application Data

(60) Provisional application No. 60/982,682, filed on Oct. 25, 2007.

(51) Int. Cl.
G06Q 40/00 (2006.01)
(52) U.S. Cl. .............. 705/44; 705/40; 705/30; 705/33
(58) Field of Classification Search ............ 705/44
See application file for complete search history.

(56) References Cited

U.S. PATENT DOCUMENTS

| | | | |
|---|---|---|---|
| 5,898,777 A | 4/1999 | Tycksen, Jr. et al. | |
| 5,991,410 A * | 11/1999 | Albert et al. ............ | 705/78 |
| 6,125,352 A | 9/2000 | Franklin et al. | |
| 6,282,522 B1 | 8/2001 | Davis et al. | |
| 6,330,544 B1 * | 12/2001 | Walker et al. ........ | 705/14.36 |
| 6,609,113 B1 | 8/2003 | O'Leary et al. | |
| 6,704,714 B1 | 3/2004 | O'Leary et al. | |
| 6,810,234 B1 | 10/2004 | Rasanen et al. | |
| 6,934,664 B1 | 8/2005 | Webb et al. | |
| 7,031,733 B2 | 4/2006 | Alminana et al. | |
| 7,076,329 B1 | 7/2006 | Kolls | |
| 7,124,937 B2 | 10/2006 | Myers et al. | |
| 7,127,264 B2 | 10/2006 | Hronek et al. | |
| 7,136,841 B2 | 11/2006 | Cook | |
| 7,152,780 B2 | 12/2006 | Gauthier et al. | |
| 7,245,905 B2 | 7/2007 | Kamdar et al. | |
| 7,246,084 B1 * | 7/2007 | Javangula et al. ......... | 705/26.35 |
| 7,251,495 B2 | 7/2007 | Keyani et al. | |
| 7,275,685 B2 * | 10/2007 | Gray et al. ............. | 235/380 |
| 7,387,250 B2 | 6/2008 | Muni | |
| 7,567,934 B2 * | 7/2009 | Flitcroft et al. ........... | 705/37 |
| 7,571,141 B2 | 8/2009 | Huang et al. | |

(Continued)

FOREIGN PATENT DOCUMENTS

AU 763262 1/2000

(Continued)

OTHER PUBLICATIONS

Microsoft Computer Dictionary, Fifth Edition, 2002. Definition of Code and Program.*

(Continued)

*Primary Examiner* — Shahid Merchant
*Assistant Examiner* — Joan Goodbody
(74) *Attorney, Agent, or Firm* — Kilpatrick Townsend & Stockton

(57) ABSTRACT

Systems and methods of conducting a payment transaction using a mobile phone as a relay. The systems and methods receive transaction information associated with a transaction at a mobile communication device from a merchant. They send the transaction information with the mobile communication device to an issuer associated with the mobile communication device. The issuer thereafter sends an authorization response message to the merchant.

25 Claims, 6 Drawing Sheets

U.S. PATENT DOCUMENTS

| | | | |
|---|---|---|---|
| 7,580,898 B2 * | 8/2009 | Brown et al. | 705/75 |
| 7,584,153 B2 | 9/2009 | Brown et al. | |
| 7,611,054 B2 | 11/2009 | Bortolin et al. | |
| 7,654,451 B2 | 2/2010 | Bortolin et al. | |
| 7,707,120 B2 | 4/2010 | Dominguez et al. | |
| 7,958,052 B2 * | 6/2011 | Powell | 705/44 |
| 2001/0034717 A1 | 10/2001 | Whitworth | |
| 2001/0037264 A1 | 11/2001 | Husemann et al. | |
| 2002/0069165 A1 | 6/2002 | O'Neil | |
| 2002/0116329 A1 | 8/2002 | Serbetcioglu et al. | |
| 2002/0174121 A1 | 11/2002 | Clemie | |
| 2003/0028481 A1 * | 2/2003 | Flitcroft et al. | 705/39 |
| 2003/0065615 A1 | 4/2003 | Aschir | |
| 2003/0139174 A1 | 7/2003 | Rao | |
| 2003/0171993 A1 | 9/2003 | Chappuis | |
| 2003/0182207 A1 * | 9/2003 | Skinner | 705/26 |
| 2003/0194071 A1 | 10/2003 | Ramian | |
| 2003/0200184 A1 * | 10/2003 | Dominguez et al. | 705/78 |
| 2003/0212601 A1 | 11/2003 | Silva et al. | |
| 2003/0220835 A1 * | 11/2003 | Barnes, Jr. | 705/14 |
| 2004/0019564 A1 | 1/2004 | Goldthwaite et al. | |
| 2004/0044621 A1 | 3/2004 | Huang et al. | |
| 2004/0048025 A1 | 3/2004 | Lohnes | |
| 2004/0097217 A1 * | 5/2004 | McClain | 455/411 |
| 2004/0214597 A1 | 10/2004 | Suryanarayanna et al. | |
| 2004/0248548 A1 | 12/2004 | Niwa et al. | |
| 2005/0131826 A1 | 6/2005 | Cook | |
| 2005/0144020 A1 | 6/2005 | Muzaffar et al. | |
| 2005/0172148 A1 | 8/2005 | Ying | |
| 2005/0203854 A1 * | 9/2005 | Das et al. | 705/64 |
| 2005/0211771 A1 | 9/2005 | Onozu | |
| 2005/0238149 A1 | 10/2005 | De Leon | |
| 2005/0240526 A1 * | 10/2005 | Hill | 705/40 |
| 2006/0006226 A1 | 1/2006 | Fitzgerald et al. | |
| 2006/0018450 A1 | 1/2006 | Sandberg-Diment | |
| 2006/0080232 A1 | 4/2006 | Epps | |
| 2006/0149644 A1 | 7/2006 | Sulmar et al. | |
| 2006/0163345 A1 | 7/2006 | Myers et al. | |
| 2006/0253339 A1 | 11/2006 | Singh et al. | |
| 2007/0022058 A1 | 1/2007 | Labrou et al. | |
| 2007/0051797 A1 | 3/2007 | Randolph-Wall et al. | |
| 2007/0063017 A1 | 3/2007 | Chen et al. | |
| 2007/0078759 A1 * | 4/2007 | Lilly et al. | 705/38 |
| 2007/0094085 A1 | 4/2007 | Redmond et al. | |
| 2007/0094135 A1 | 4/2007 | Moore et al. | |
| 2007/0100651 A1 | 5/2007 | Ramer et al. | |
| 2007/0106564 A1 | 5/2007 | Matotek et al. | |
| 2007/0108269 A1 | 5/2007 | Benco et al. | |
| 2007/0124211 A1 | 5/2007 | Smith | |
| 2007/0136211 A1 * | 6/2007 | Brown et al. | 705/75 |
| 2007/0203836 A1 | 8/2007 | Dodin | |
| 2007/0208671 A1 | 9/2007 | Brown et al. | |
| 2007/0213991 A1 | 9/2007 | Bramante | |
| 2007/0233615 A1 * | 10/2007 | Tumminaro | 705/75 |
| 2007/0241183 A1 | 10/2007 | Brown et al. | |
| 2007/0255620 A1 | 11/2007 | Tumminaro et al. | |
| 2007/0255652 A1 | 11/2007 | Tumminaro et al. | |
| 2007/0255653 A1 | 11/2007 | Tumminaro et al. | |
| 2008/0033793 A1 * | 2/2008 | Roberts | 705/14 |
| 2008/0040276 A1 | 2/2008 | Hammad et al. | |
| 2008/0048025 A1 * | 2/2008 | Fitzgerald et al. | 235/380 |
| 2008/0222048 A1 | 9/2008 | Higgins et al. | |
| 2008/0228611 A1 * | 9/2008 | Lilly et al. | 705/34 |
| 2009/0006262 A1 * | 1/2009 | Brown et al. | 705/64 |
| 2009/0112768 A1 | 4/2009 | Hammad et al. | |
| 2009/0254485 A1 | 10/2009 | Baentsch et al. | |

FOREIGN PATENT DOCUMENTS

| | | |
|---|---|---|
| EP | 1109138 A2 | 6/2001 |
| EP | 1668580 | 3/2005 |
| EP | 1783623 A1 | 5/2007 |
| FR | 2787273 A | 6/2000 |
| JP | 2002-092320 | 3/2002 |
| KR | 1020070051817 | 5/2007 |
| KR | 10-2010-0027679 A | 3/2010 |
| WO | WO 96/13814 A1 | 5/1996 |
| WO | WO 97/45814 A1 | 12/1997 |
| WO | WO 00/33265 A1 | 6/2000 |
| WO | WO 01/63375 A2 | 8/2001 |
| WO | WO 01/71627 A2 | 9/2001 |
| WO | WO 03/038712 A1 | 5/2003 |
| WO | WO 2006/095212 A1 | 9/2006 |

OTHER PUBLICATIONS

European Search Report for European Patent Application No. 00843018.6. Mailed on Apr. 27, 2011 9 pages.

U.S. Appl. No. 60/905,560, filed Mar. 7, 2007, 13 pages.

* cited by examiner

Merchant ID

| Item 1 | $50 | SKU Number 1 |
| Item 2 | $50 | SKU Number 2 |
| Item 3 | $50 | SKU Number 3 |
| Item 4 | $50 | SKU Number 4 |

Total Price: $200

Item 1   $50
Item 2   $50
Item 3   $50
Item 4   $50
Total Price: $200

If you want to conduct the transaction above,
Please enter your PIN _____

PAYMENT TRANSACTION USING MOBILE PHONE AS RELAY

CROSS-REFERENCES TO RELATED APPLICATIONS

This patent application claims priority to U.S. Provisional Application No. 60/982,682 filed Oct. 25, 2007, entitled "Mobile Phone Payment System and Method," which is hereby incorporated by reference in its entirety for all purposes.

BACKGROUND

Identity theft and identity fraud have become increasingly serious problem as devices for engaging in financial transactions have increased in number. These fraudulent activities have become very costly to consumers, merchants, financial institutions, and others.

Prior systems provide various fraud deterrent techniques. For example, some systems ensure that payment devices are only used by authorized cardholders. As another example, some systems encrypt communications with identity information.

These fraud deterrent systems can still be improved. For example, consumers in prior systems typically provide their identity information to the merchant at a point-of sale terminal to authenticate themselves. The identity information is typically forwarded through a series of entities to authorize and process the transaction. At any point along this line of communication, identity information can be stolen or used fraudulently. For example, a wireless transmitter can be implanted in a point of sale terminal that records PINs and account numbers, and sends them back to an identity thief to be used fraudulently.

Embodiments of this disclosure address these and other problems.

SUMMARY

Embodiments of the invention relate to methods and systems for conducting payment transactions using a mobile communication device (e.g., mobile phone) as a relay.

An embodiment of the disclosure is directed to a method that receives transaction information associated with a transaction at a mobile communication device from a merchant. The method also sends the transaction information with the mobile communication device to an issuer associated with the mobile communication device. The issuer thereafter sends an authorization response message to the merchant.

Another embodiment is directed to a computer readable medium having code for receiving transaction information associated with a transaction at a mobile communication device from a merchant. The computer readable medium also has code for sending the transaction information with the mobile communication device to an issuer associated with the mobile communication device. The issuer thereafter sends an authorization response message to the merchant. Another embodiment is directed to a server computer having the above-described computer readable medium.

Another embodiment is directed to a phone having a computer readable medium comprising code for receiving transaction information associated with a transaction from a merchant and code for sending the transaction information to an issuer associated with the mobile communication device. The issuer thereafter sends an authorization response message to the merchant. The phone also has a processor in communication with the computer readable medium.

Another embodiment is directed to a method that receives transaction information associated with a transaction from a mobile communication device wherein mobile communication device receives the transaction information from a merchant. The method also sends the transaction information to an issuer associated with the mobile communication device, wherein the issuer thereafter sends an authorization response message to the merchant.

Another embodiment is directed to a computer readable medium comprising code for receiving transaction information associated with a transaction from a mobile communication device, wherein the mobile communication device received the transaction information from a merchant. The computer readable medium also has code for sending the transaction information to an issuer associated with the mobile communication device, wherein the issuer thereafter sends an authorization response message to the merchant. Another embodiment is directed to a server computer having the above-described computer readable medium.

These and other embodiments of the invention are described in further detail below.

BRIEF DESCRIPTION OF THE DRAWINGS

FIG. 5A is an illustration depicting an exemplary display on an access device at merchant, in accordance with an embodiment of the disclosure.

FIG. 5B is an illustration depicting an exemplary display on a mobile communication device, in accordance with an embodiment of the disclosure.

DETAILED DESCRIPTION

Figure 1:
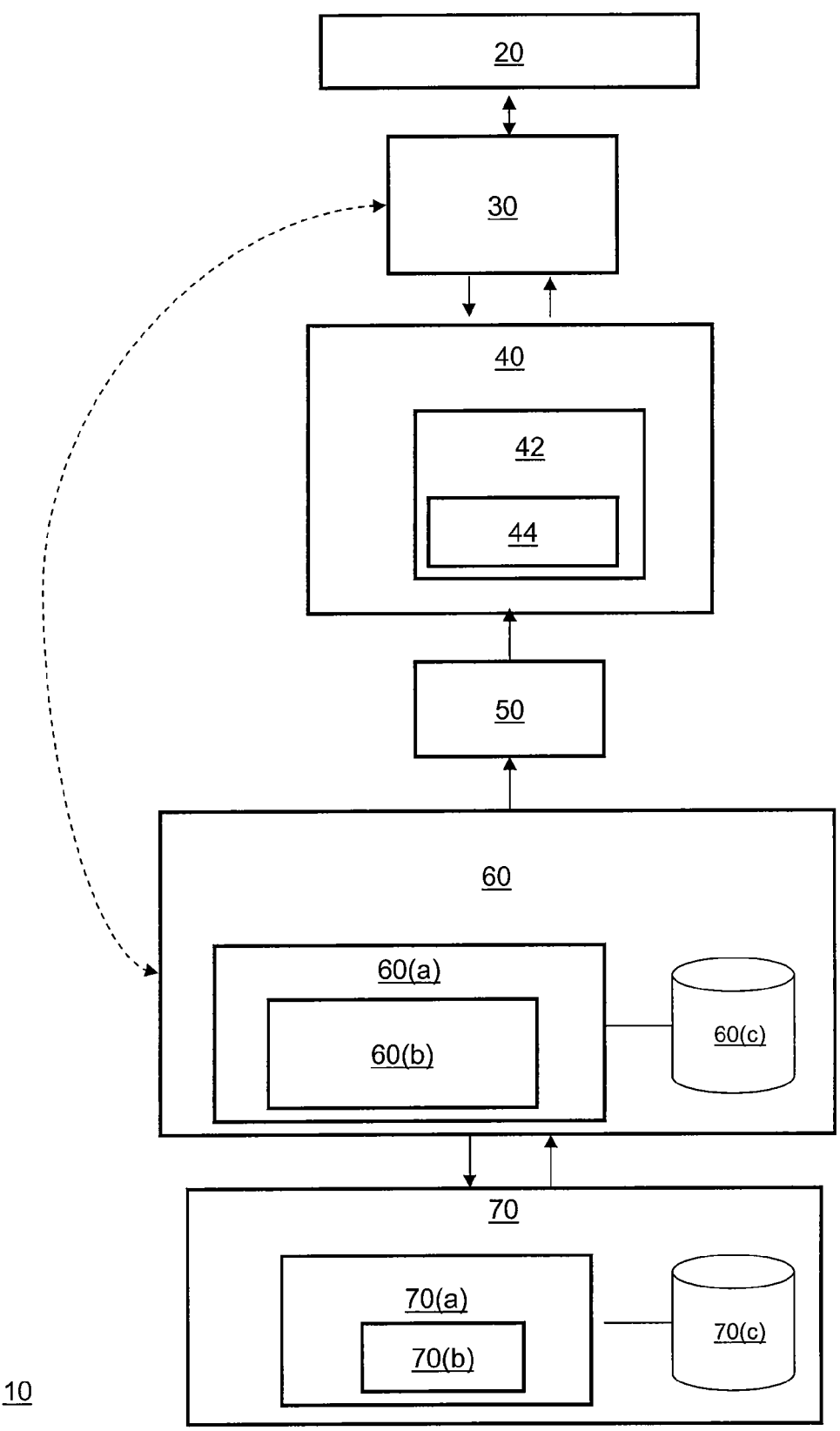
FIG. 1 is a block diagram of an exemplary system for conducting a payment transaction using a mobile phone as a relay, in accordance with an embodiment of the disclosure.

Embodiments of the invention are directed to a method and a system for conducting payment transactions using a mobile phone or other mobile communication device as a relay. In some embodiments, a consumer selects items for a purchase at a merchant. The merchant enters information about the items into an access device (e.g., a point-of-sale terminal). The merchant sends the transaction information to consumer's mobile communication device (e.g., mobile phone). The mobile communication device relays the transaction information to the issuer of a consumer's account for authorization. The issuer sends a message authorizing the transaction to the merchant to complete the transaction.

Certain embodiments of the invention may provide one or more advantages to consumers, merchants, issuers, and others. An advantage to a consumer is that his identification information is more secure. Since the consumer can communicate the transaction and identification information directly to the payment processing network through his mobile communication device, the access device (e.g., point of sale terminal) no longer requires the identification information to conduct the transaction. Thus, the consumer does not need to provide his identification information to the access device, which eliminates the problem of identity theft at the access device. In many cases, identity theft can occur when the access device is located at a fraudulent merchant or when the access device itself is unauthorized, because it was placed at a legitimate merchant by an unauthorized person. Further, a direct line of communication from the consumer to the payment processing network is easier to protect and thus more secure. For example, the mobile communication device can include a secure chip with encryption software. Since the payment processing network communicates directly with the mobile communication device, the payment processing network can provide frequent and timely updates of encryption software to the mobile communication device. Thus, the consumer's identity information is more secure in this system.

Another advantage to a consumer is that the consumer has more control over his identity information and over the transaction in general. In prior systems, the consumer had to provide his identity information (e.g., a PAN or personal account number) to the access device (e.g., the point of sale terminal) in order to conduct a transaction. In this system, the mobile communication device has much of the functionality of an access device. The mobile communication device can be used to initiate, authorize, and/or terminate the transaction. Since the consumer is in control of the mobile communication device, the consumer decides when to conduct the transaction and to whom he will provide his identity information. Thus, control of the transaction and identity information is given back to the consumer.

An advantage to merchants and issuers is that these methods and systems are easier to secure and can prevent monetary losses due to identity theft. As discussed above, these systems are inherently more secure and thus should reduce fraud and money lost to fraud. Further, the issuer can save money by concentrating their fraud deterrent efforts on protecting information communicated between the payment processing network and the mobile communication device.

An advantage to the payment processing network is that the network can more easily secure the communications to the consumer. As discussed above, the mobile communication device can include a secure chip with encryption software which is frequently updated by the payment processing network. Also, the encryption algorithms can be more complex since communications are not sent through a series of other entities.

Another advantage to the payment processing network is that the payment processing network can develop a more sophisticated transaction process since it has a more detailed account of the transaction. The mobile communication device can receive greater detail about the transaction and relay it to the payment processing network. With increased information, the payment processing network has the opportunity to develop new and more sophisticated techniques of processing transactions.

Certain embodiments of the invention may include none, some, or all of the above technical advantages. One or more other technical advantages may be readily apparent to one skilled in the art from the figures, descriptions, and claims included herein.

I. Exemplary System with Mobile Phone as a Relay

FIG. 1 is a block diagram of an exemplary system 10 for conducting a payment transaction using a mobile phone as a relay, in accordance with an embodiment of the disclosure.

System 10 includes a consumer 20 in operative communication with a mobile communication device 30 (e.g. a mobile phone). System 10 also includes a merchant 40 having an access device 42 (e.g., a point-of-sale terminal) with a display 44. Mobile communication device 30 is also in communication with merchant 40 to receive transaction information from the access device 42. System 10 also includes an acquirer 50 (e.g., a bank) associated with merchant 40.

System 10 also includes a payment processing network 60 having a server computer 60(a) with a computer readable medium 60(b) and a database 60(c) in communication with the server computer 60(a). System 10 also includes an issuer 70 having an account with consumer 20. Issuer 70 has a server computer 70(a) with a CRM 70(b) and a database 70(c) communicating with server computer 70(a). Issuer 70 is in communication with payment processing network 60. Acquirer 50 is in communication with payment processing network 60 and merchant 50 to receive authorization for the transaction and forward it to merchant 40. In system 10, mobile communication device 30 is also in direct communication with payment processing network 60 in order to send transaction information and other information to payment processing network 60 and issuer 70.

As used herein, "transaction information" can refer to any suitable information related to the transaction. Some examples of suitable information include a list of the items in the transaction, a description of the items, item identifiers (e.g., stock keeping units or SKUs), the merchant ID, access device ID (e.g., POS terminal ID), prices of the items being purchased, the total number of items, the total amount of the transaction, electronic signature from merchant 40, a transaction code, and other suitable information related to the transaction. A transaction code is associated with a specific transaction and an be used to identify other transaction information. For example, the transaction code can be used to link the transaction information from the mobile communication device 30 to the payment information (e.g., a BIN) from the mobile communication device 30 to complete the transaction.

Consumer 20 may be an individual, or an organization such as a business that is capable of using mobile communication device 30 to conduct a transaction such as a purchase of goods and/or services. Consumer 20 has an account with issuer 70 that is associated with mobile communication device 30.

Mobile communication device 30 refers to any suitable wireless device that allows consumer 20 to conduct transactions with merchant 40 and communicate information with other entities such as payment processing network 60. Some examples of suitable devices include cellular or wireless phones, personal digital assistants (PDAs), pagers, portable computers, and the like. Suitable mobile communication devices can be hand-held and compact so that they can fit into a consumer's wallet and/or pocket (e.g., pocket-sized).

Mobile communication device 30 communicates information to other system entities in any suitable form. Some examples of suitable forms include a short message service (SMS) message such as a text message, a multimedia media message (MMS), a phone call, a voice message, a voicemail message, an instant messaging (IM) message, an email message, etc. In some cases, the system entity receiving the message (e.g., payment processing network 60) may require a PIN before authorizing the transmission for security purposes. Consumer 20 enters the PIN into mobile communicating device 30 or other device communicating with the entity. The PIN is then sent to the entity. Once the entity verifies the PIN, the requesting entity will authorize the transmission of the message. For example, to send a SMS message to payment processing network 60, payment processing network 60 may request a PIN, receive and verify a valid PIN before allowing transmission of the SMS message.

In some embodiments, mobile communication device 30 may include specialized software to allow it to interact directly other system entities. For example, mobile communication device 30 may include translation software that translates transaction information received from access device 42 into a form that can be understood, processed, and transmitted by payment processing network 60.

In embodiments of the invention, an issuer may be associated with the mobile communication device in any suitable manner. For example, the issuer may have an account that is linked to the phone number in the mobile communication device. In another example, the issuer may have a virtual payment card that is stored on the mobile communication device.

Merchant 40 refers to any suitable entity that conducts transactions with consumer 20 using mobile communication device 30. Some examples of merchants 40 include a department store, a gas station, a drug store, a grocery store, or other suitable business. Merchant 40 may use any suitable method to conduct the transaction. For example, merchant 40 may use an e-commerce business to allow the transaction to be conducted by merchant 40 through the Internet.

Access device 42 refers to any suitable device for communicating with merchant 40 and for interacting with mobile communication device 30 and/or a payment card. Examples of suitable devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. Access device 42 may use any suitable contact or contactless mode of operation to communicate data to and from mobile communication device 30. For example, access device 42 can use a wireless communication mode including near field communication such as Bluetooth, infrared, etc.

Acquirer 50 refers to any suitable entity that has an account with merchant 40. For example, acquirer 50 may be a bank that operates a bank account for merchant 40.

The payment processing network 60 may include data processing subsystems, networks, and operations used to support and deliver authorization services, exception file services, and clearing and settlement services. An exemplary payment processing network 60 may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Payment processing network 60 includes a server computer 60(a). Server computer 60(a) refers to a powerful computer or cluster of computers. For example, the server computer 60(a) can be a large mainframe, a minicomputer cluster, or a group of servers functioning as a unit. In one example, server computer 60(a) may be a database server coupled to a Web server (not shown). Payment processing network 60 may use any suitable wired or wireless network, including the Internet.

Server computer 60(a) includes a computer readable medium (CRM) 60(b). CRM 60(b) comprises code for performing the functions of server computer 60(a). Server computer 60(a) may also include a processor (not shown). In some embodiments, the computer readable medium 60(b) may comprise code for receiving transaction information associated with a transaction from a mobile communication device, wherein the mobile communication device received the transaction information from a merchant; and code for sending the transaction information to an issuer associated with the mobile communication device.

Payment processing network 60 also includes a database 60(c) coupled to the server computer 60(a). Database 60(c) refers to any hardware, software, firmware, or combination of the preceding for storing and facilitating retrieval of information. Database 60(c) may use any of a variety of data structures, arrangements, and compilations to store and facilitate retrieval of information. Database 60(c) may store any suitable data. In one embodiment, database 60(c) includes data that links information associated with the mobile communication device 30 (e.g., phone number) to account numbers and other information of consumer 20. Database 60(c) also includes data that links consumer data (e.g., account numbers) to issuers 70.

Issuer 70 refers to any suitable entity that can approve a transaction, and may optionally open and maintain an account associated with consumer 20. Some examples of issuers may be a bank, a business entity such as a retail store, or a governmental entity. In many cases, issuer 70 may also issue a payment card to consumer 20. In some embodiments, issuer 70 may also be the acquirer 50.

Issuer 70 includes a server computer 70(a). Server computer 70(a) refers to a powerful computer or cluster of computers. For example, server computer 70(a) can be a large mainframe, a minicomputer cluster, or a group of servers functioning as a unit. In one example, server computer 70(a) may be a database server coupled to a Web server (not shown). Server computer 70(a) includes a computer readable medium (CRM) 70(b). CRM 70(b) comprises code for performing the functions of server computer 70(a). Server computer 70(a) may also include a processor (not shown).

Issuer 70 also includes a database 70(c) coupled to the server computer 70(a). Database 70(c) refers to any hardware, software, firmware, or combination of the preceding for storing and facilitating retrieval of information. Database 70(c) may use any of a variety of data structures, arrangements, and compilations to store and facilitate retrieval of information. Database 70(c) may store any suitable data. Issuer 70 may use any suitable wired or wireless network, including the Internet.

In a typical purchase transaction, consumer 20 selects items (e.g., products and/or services) to purchase from merchant 40. A list of the items in the transaction, the total amount of the transaction, and a merchant ID along with other transaction information is shown on display 44 of access device 42.

Consumer 20 initiates the transaction. For example, consumer 20 can request that merchant 40 process the transaction and merchant 40 can in response activate access device 42 to initiate the transaction. As another example, consumer 20 may interact his mobile communication device 30 with access device 42 at merchant 40 to initiate the transaction.

Once the transaction is initiated, access device 42 sends the transaction information to mobile communication device 30 using a contactless or contact-based mode. In some cases, mobile communication device 30 may need to translate the transaction information into a form that is compatible for use by payment processing network 60.

Mobile communication device 30 relays the transaction information along with other information (e.g., a phone number) associated with the mobile communication 30 to server computer 60(a) of payment processing network 60. In some cases, server computer 60(a) of payment processing network 60 will not receive the transmission of information until the consumer 20 sends a PIN and the PIN is verified. Server computer 60(a) uses the PIN to authenticate the consumer 20.

Server computer 60(a) of payment processing network 60 processes the information received from mobile communication device 30. For example, server computer 60(a) processes the information to determine an account number and issuer associated with consumer 20. For example, server computer 60(a) in payment processing network 60 retrieves data from database 60(c) that links the information associated with the mobile communication device 30 (e.g., phone number) to the account number and other consumer information. Server computer 60(a) uses this data to determine the consumer information (e.g., account number) from the phone number. Server computer 60(a) also retrieves data from database 60(c) that links the consumer data such as account number to the issuer 70. Server computer 60(a) uses this data to determine the issuer 70 associated with the consumer 20.

In other embodiments, the consumer information such as the account number can be stored on mobile communication device 30. In these embodiments, mobile communication device 30 relays the consumer information with the account number to the server computer 60(a) of payment processing network 60. In other embodiments, mobile communication device 30 relays one or more account numbers and other information of consumer 20 to server computer 60(a) of payment processing network 60.

The payment processing network now has information about the consumer 20 holding the mobile communication device 30, the issuer 70 having an account associated with the mobile communication device 30, the merchant 50 based on the merchant ID or access device ID, and the transaction. Server computer 60(a) sends the information in an authorization request message to issuer 70. Issuer 70 processes the authorization request message and determines whether to authorize or decline the transaction.

Once issuer 70 decides whether to authorize or decline the transaction, issuer 70 sends an authorization response message to server computer 60(a) indicating that the transaction is authorized (or is declined). The issuer 70 may decline the transaction for a variety of reasons (e.g., insufficient funds, risky transaction, etc.). Server computer 60(a) sends the authorization response message to acquirer 50. Acquirer 50 forwards the authorization response message to merchant 40. After merchant 40 receives the authorization response message, access device 42 at merchant 40 may provide the authorization response message to consumer 20. The authorization response message may be displayed on display 44 of access device 42 or may be printed on a receipt. In some cases, server computer 60(a) of payment processing network 60 sends the authorization response message directly to consumer 20. For example, the authorization response message may be sent from the payment processing network 60 directly to the mobile communication device 30 without being sent through the acquirer 50.

In some cases, payment processing network 60 can authorize the transaction on behalf of issuer 70. In these cases, server computer 60(a) of payment processing network 60 processes the information received from mobile communication device 30. After processing, server computer 60(a) of payment processing network 60 has information about the consumer 20 holding the mobile communication device 30, the issuer 70 having an account associated with the mobile communication device 30, the merchant 50 based on the merchant ID or access device ID, and the transaction. With this information, server computer 60(a) can determine whether to authorize or decline the transaction on behalf of the issuer 70. Server computer 60(a) sends an authorization response message to acquirer 50. Acquirer 50 forwards the authorization response message to merchant 40 which forward it to consumer 20. Server computer 60(a) may also send a message to issuer 70 indicating that the transaction has been authorized on their behalf and including other suitable information required by the issuer 70 to process the transaction.

At the end of the day, a normal clearing and settlement process can be conducted. A clearing process is a process of exchanging financial details between merchant 40 and issuer 70 to facilitate posting to a consumer's account and reconciliation of the consumer's settlement position. Clearing and settlement can occur simultaneously.

In another embodiment, mobile communication device 30 relays the transaction information and information associated with the mobile communication device 30 directly to the issuer 70. The information may be sent in any suitable form such as an authorization request message. In this embodiment, the issuer 70 determines whether to authorize or decline the transaction based on the information received from mobile communication device 30. If the issuer 70 requires more information from consumer 20 to decide whether to authorize or decline, issuer 70 may send a request message for more information to consumer 20 through mobile communication device 30. Once issuer 70 decides whether to authorize or decline the transaction, issuer 70 sends an authorization request message to consumer 30 or to merchant 40 through acquirer 50.

In yet another embodiment, server computer 60(a) of payment processing network 60 may send the authorization response message directly to the mobile communication device 30 operated by the consumer 20 instead of to the merchant's access device 42. The consumer 20 can provide the authorization response message to the access device 42 to merchant 40 using the mobile communication device 30. For example, consumer 20 may cause the mobile communication device 30 to pass by a contactless reader of access device 42 so that the access device 42 can read the authorization response message from mobile communication device 30.

In one embodiment, merchant 40 may be an ecommerce business that sells its products and/or services on a website. The website is provided by a server computer operated by merchant 40 or another entity on behalf of merchant 40. Consumer 20 select items on the website for purchase. Once consumer 20 selects the items, transaction information such as a transaction amount and transaction code is provided to consumer 20. Consumer 20 enters the transaction information into the mobile communication device 30. Consumer 20 uses the mobile communication device 30 to relay the transaction information and payment information in a message to the payment processing network 60. Merchant 40 sends the transaction information in a message to payment processing network 60. Payment processing network 60 matches the message from the merchant 40 to the message from the mobile communication device 30 using the transaction information (e.g., a transaction code). Payment processing network 60 processes the transaction based on the transaction information from the merchant 40 and the payment information from the consumer 30. In this embodiment, merchant 40 does not receive payment information of consumer 20.

In one embodiment, consumer 20 can also request emergency cards from payment processing network 60 using their mobile communication device 30. For example, consumer 20 may have lost their payment card. Consumer 20 can use their mobile communication device 30 to send a message with a request for a replacement card to server computer 60(a) of payment processing network 60 to forward to issuer 70 or send a message with the request directly to issuer 70. In response, a replacement card or new account information may be sent to mobile communication device 30 or a replacement card may be mailed to consumer 20.

Modifications, additions, or omissions may be made to system 10 without departing from the scope of the disclosure. The components of system 10 may be integrated or separated according to particular needs. For example, although separate functional blocks are shown for an issuer, payment processing network, and acquirer, some entities perform all of these functions and may be included in embodiments of invention. Moreover, the operations of system 10 may be performed by more, fewer, or other system modules. Additionally, operations of system 10 may be performed using any suitable logic comprising software, hardware, other logic, or any suitable combination of the preceding.

II. Exemplary Mobile Communication Device

Figure 2:
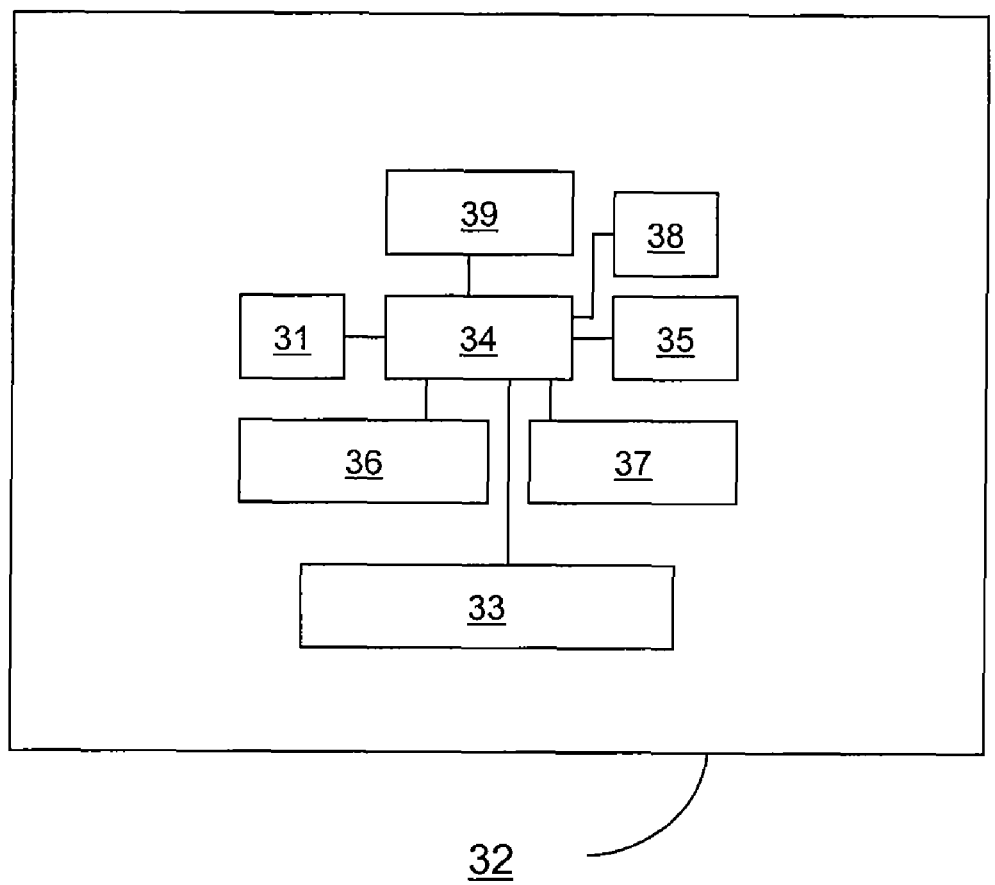
FIG. 2 is a schematic drawing of an exemplary mobile communication device in the form of a mobile phone, in accordance with an embodiment of the disclosure.

FIG. 2 is a schematic drawing of an exemplary mobile communication device 30 in the form of a mobile phone, in accordance with an embodiment of the disclosure. The exemplary mobile communication device 30 comprises a computer readable medium (CRM) 31 and a body 32. Computer readable medium 31 may be present within body 32, or may be detachable from it. Body 32 may be in the form a plastic substrate, housing, or other structure. Computer readable medium 31 may be a memory that stores data and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by mobile communication device 30.

Computer readable medium, or memory, may further comprise any suitable code. In some embodiments, computer readable medium, or memory, comprises: a) code for receiving information from access device 42; b) code for sending information to an issuer 70; c) code for sending information to payment processing network 60; d) code for receiving information from payment processing network 60; and/or e) code for receiving information from issuer 70.

The exemplary mobile communication device 30 also includes a contactless element 33, which is typically implemented in the form of a semiconductor chip (or other data storage element) with an associated wireless transfer (e.g., data transmission) element, such as an antenna. Contactless element 33 is associated with (e.g., embedded within) mobile communication device 30 and data or control instructions transmitted via a cellular network may be applied to contactless element 33 by means of a contactless element interface (not shown). The contactless element interface functions to permit the exchange of data and/or control instructions between the mobile device circuitry (and hence the cellular network) and an optional contactless element 33.

Contactless element 33 is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the mobile communication device 30 and an interrogation device. Thus, the mobile communication device 30 is capable of communicating and transferring data and/or control instructions via both cellular network and near field communications capability.

The mobile communication device 30 may also include a processor 34 (e.g., a microprocessor) for processing the functions of the mobile communication device 30 and a display 35 to allow a consumer to see phone numbers and other information and messages. The mobile communication device 30 may further include input elements 36 to allow a consumer to input information into the device, a speaker 37 to allow the consumer to hear voice communication, music, etc., and a microphone 38 to allow the consumer to transmit her voice through the mobile communication device 30. The mobile communication device 30 may also include an antenna 39 for wireless data transfer (e.g., data transmission).

Although FIG. 2 shows a number of components, mobile communication device 30 according to embodiments of the invention may comprise any suitable combination or subset of such components.

III. Exemplary Access Device

Figure 3:
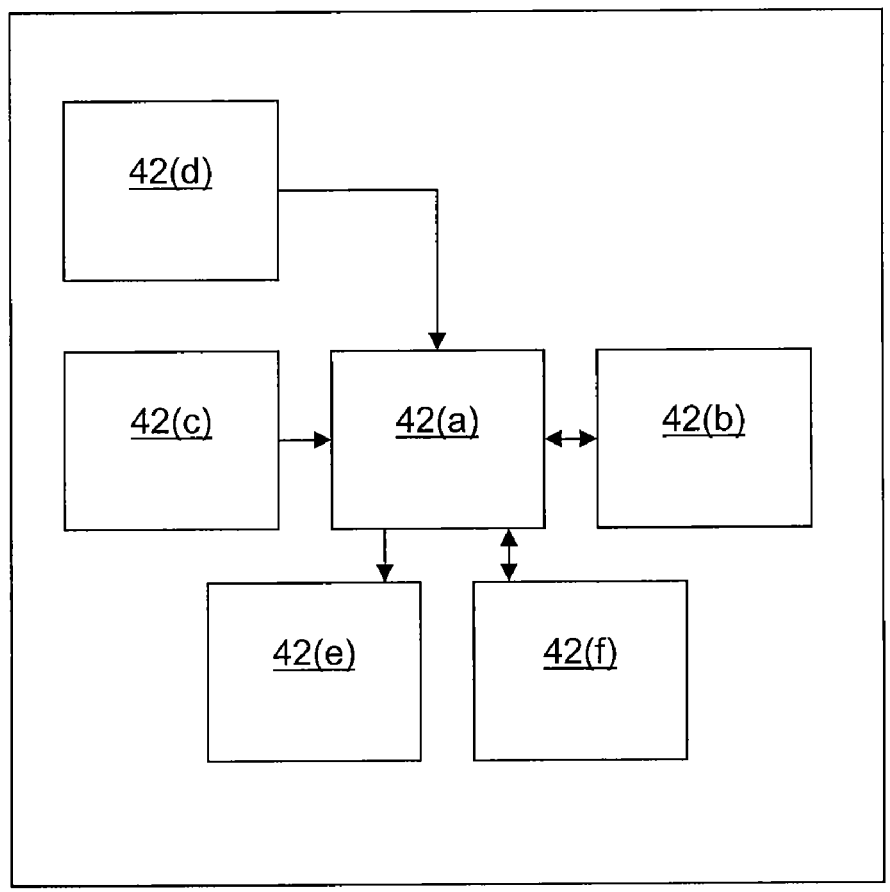
FIG. 3 is a block diagram of the basic components that may reside in an exemplary access device, in accordance with an embodiment of the disclosure.

FIG. 3 is a block diagram of the basic components that may reside in an exemplary access device 42, in accordance with an embodiment of the disclosure. An exemplary access device 53 may comprise a processor 42(*a*). It may also comprise a computer readable medium 42(*b*), keypad 42(*c*), a mobile communication device reader 42(*d*), an output device 42(*e*), and a network interface 42(*f*), all operatively coupled to the processor 42(*a*). A housing may house one or more of these components. Exemplary mobile communication device readers can include RF (radio frequency) antennas, magnetic stripe readers, etc. that interact with the mobile communication device 30. Suitable output devices may include display 44, other displays, and audio output devices. Exemplary computer readable media may include one or more memory chips, disk drives, etc.

Figure 4:
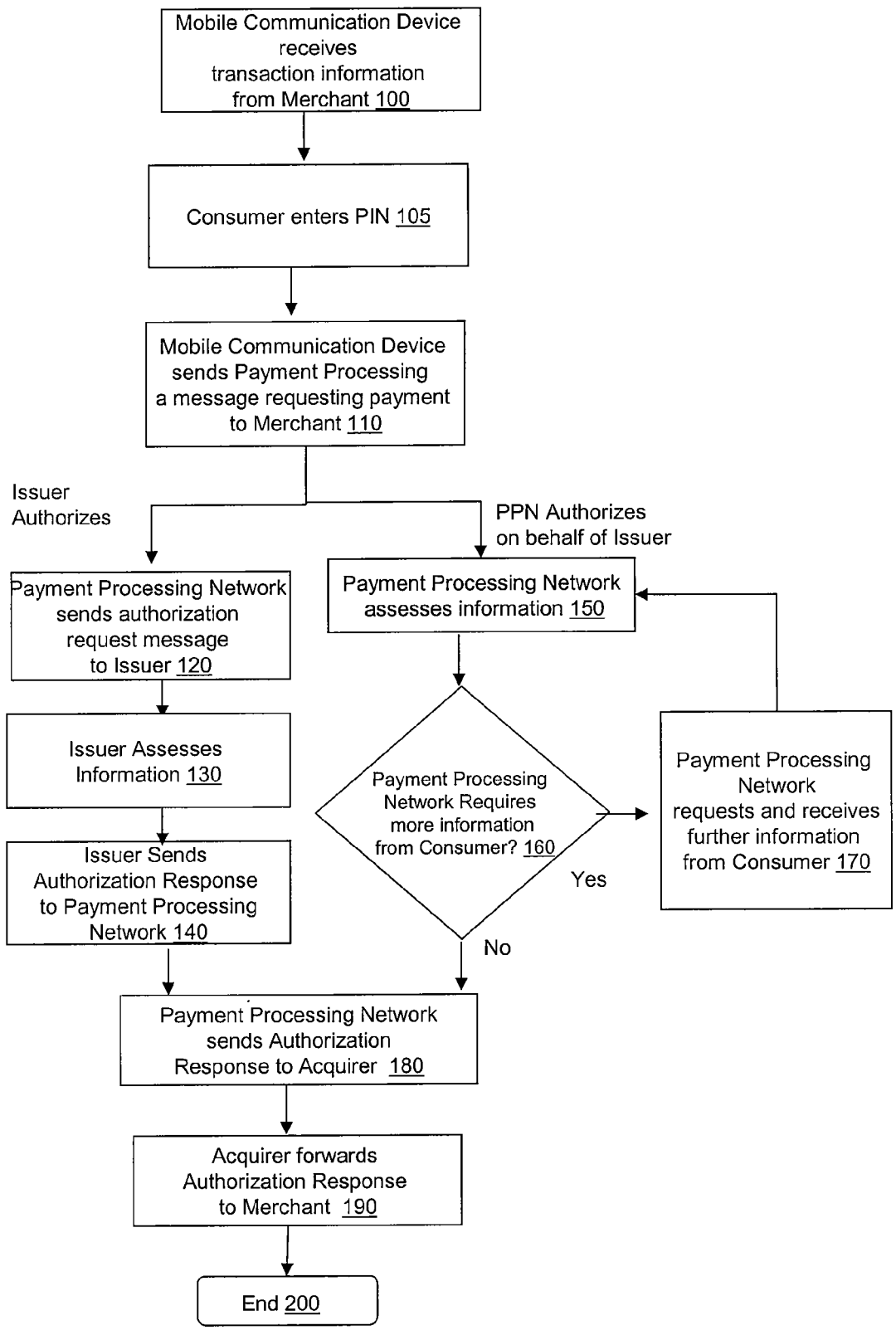
FIG. 4 is a flowchart illustrating a method of processing a payment transaction using a mobile communication device as a relay, in accordance with an embodiment of the disclosure.

IV. Exemplary Method of Processing a Payment Transaction Using a Mobile Communication Device (e.g., a Mobile Phone) as a Relay FIG. 4 is a flowchart illustrating a method of processing a payment transaction using a mobile communication device as a relay, in accordance with an embodiment of the disclosure.

The method begins by mobile communication device 30 receiving transaction information from merchant 40 (step 100). Consumer 20 may interact the mobile communication device 30 with access device 42 at merchant 40 to initiate the transmission of the transaction information. In some cases, the information may be sent in the form of a message to mobile communication device 30.

In one embodiment, mobile communication device 30 receives the information from merchant 40 by reading the information from display 44 on access device 42. Mobile communication device 30 can have any suitable device for reading the information from display 44. For example, mobile communication device 30 may have a camera which takes a picture image of display 44. Mobile communication device 30 or payment processing network 60 may have optical character recognition software that converts the image into transaction data. In another example, mobile communication device 30 may have a bar code reader that reads bar codes from display 44 to determine transaction information.

Consumer 20 operates mobile communication device 30 to communicate a request to transmit transaction information to payment processing network 60 along with information about the mobile communication device 30 (e.g., a phone number). In the illustrated embodiment, payment processing network 60 requires a PIN before allowing information to be received at payment processing network 60. Consumer 20 enters a PIN into mobile communication device 30 or another device in communication with payment processing network 60 (step 105). Payment processing network 60 authenticates consumer 20 with the PIN and the information about the mobile communication device 30 and authorizes the transmission of transaction information.

After receiving authorization to send the transmission, mobile communication device 30 sends an authorization request message to payment processing network 60 with the transaction information and information associated with the mobile communication device 30 (step 110). In the illustrated embodiment, payment processing network 60 either: a) authorizes the transaction on behalf of issuer 70, or b) forwards the authorization request message to issuer 70 to authorize the transaction.

If issuer 70 is authorizing the transaction, payment processing network 60 forwards the authorization request message to issuer 70 (step 120). Issuer 70 processes the authorization request message to determine whether to authorize or decline the transaction (step 130). Once issuer 70 decides whether to authorize or decline the transaction, issuer 70 sends an authorization response message to payment processing network 60 indicating that the transaction is authorized (or is declined) (step 140).

If payment processing network 60 is authorizing the transaction, payment processing network 60 processes the authorization request message to determine whether to authorize or decline the transaction (step 150). Payment processing network 60 determines whether more information is required to make the decision to authorize or decline (step 160).

If more information is required, payment processing network 60, communicates a request for more information to mobile communication device 30 and receives a response with new information from consumer 20 through mobile communication device 30 (step 170). The payment processing network 60 processes the new information from consumer 20 (step 150).

If payment processing network 60 can make the decision to authorize or decline and does not need more information from consumer 20, payment processing network 60 sends an authorization response message to acquirer 50 indicated that the transaction is authorized (or declined) (step 180). Acquirer 50 forwards the authorization response message to merchant 40 (step 190) and the method ends (step 200).

In some embodiments, access device 42 receives information from consumer 20. In one case, access device 42 may receive information directly from consumer 20 such as identification information from an identification card (e.g., driver's license) to authenticate the consumer to the merchant 40. In another case, access device 42 may receive information from consumer 20 through a payment card interacting with access device 42. In yet another case, access device 42 may receive information from consumer 20 through a mobile communication device 30 interacting with access device 42.

In one embodiment where access device 42 receives information from consumer 20, access device 42 receives information from a payment card when consumer 20 initiates a transaction with merchant 49 using a payment card. For example, consumer 20 may swipe the payment card through an appropriate slot of a cardreader of access device 42 so that the access device 42 can read information from the payment card. The information received by access device 42 from the payment card can include any suitable type of information related to payment cards such as an account number, issuer name, consumer name, and other information related to the payment card. The information may be encrypted. Access device 42 sends this information back to the mobile communication device 30 along with transaction information such as the amount of the transaction and a merchant ID or POS terminal ID. Mobile communication device 30 forwards this information directly to payment processing network 60 or through merchant 40 and acquirer 50 back to payment processing network 60. This information can be used to process the transaction.

In another embodiment where access device 42 receives information from consumer 20, access device 42 receives information from mobile communication device 30 when consumer 20 interacts the mobile communication device 30 with access device 42. For example, consumer 20 may initiate a transaction by causing the mobile communication device 30 to pass by a contactless reader of the access device 42 so that the access device 42 can read information from mobile communication device 30. Some information that could be received includes an identifier such as a verification value, phone number, or SIM card number from the mobile communication device 30. Access device 42 sends this information back to the mobile communication device 30 along with transaction information such as the amount of the transaction and a merchant ID or POS terminal ID. Mobile communication device 30 forwards this information directly to payment processing network 60 or through merchant 40 and acquirer 50 back to payment processing network 60. This information can be used to authenticate the transaction since it indicates that the mobile communication device 30 and access device 42 were interacting during the transaction.

In one embodiment, merchant 40 may sign the transaction or otherwise create an electronic signature. The electronic signature is sent along with other transaction information to mobile communication device 30. The electronic signature may be used to authorize the transaction.

In many embodiments of the disclosure, merchant 30 does not need to receive any payment information or other identity information from consumer 30. In one exemplary embodiment, merchant 40 generates transaction information including the items in the transaction and including a transaction code associated with the transaction. The transaction can be of any suitable type such as a mail order, phone transaction, or in-store purchase. Mobile communication device 30 receives the transaction code from the merchant 30. The transaction code can be provided to mobile communication device 30 via the access device 42, through a phone call, through the Internet, or by other suitable method. Consumer 20 sends the transaction code (which may be in alphanumeric form) and payment information to server computer 60(a) of payment processing network 60 using mobile communication device 30. The transaction code may be permanent or temporary. The latter is desirable, since they temporary codes can be reused and are of little value if they are intercepted. Merchant 30 also sends the transaction information including the items in the transaction and the transaction code to payment processing network 60. Server computer 60(a) of payment processing network 60 can link the transaction information regarding the items in the transaction from merchant 30 to the payment information (e.g., a BIN) associated with the mobile communication device 30. Then, the server computer 60(a) may forward the combined information to the issuer 70 as previously described.

Modifications, additions, or omissions may be made to the method without departing from the scope of the disclosure. The method may include more, fewer, or other steps. Additionally, steps may be performed in any suitable order without departing from the scope of the disclosure.

V. Exemplary Displays on Access Device and Mobile Communication Device

FIG. 5A is an illustration depicting an exemplary display 44 on an access device 42 at merchant 40, in accordance with an embodiment of the disclosure. Display 44 includes a merchant ID at the top of the display associated with merchant 40. Payment processing network 60 and/or issuer 70 can use merchant ID to identify merchant 40. Display 44 also includes a list of four items, the prices associated with each item, and the SKU number associated with each item. In addition, display 44 also includes the total amount of the transaction. Any of this information may pass from the access device 42 to the mobile communication device as described above.

Other embodiments of display may include other suitable information associated with the transaction or merchant 40. Some examples of other suitable information include an access device ID.

In addition, other embodiments of display 40 may display transaction information and other information in other ways. For example, a portion of the transaction information on display 44 may be represented by bar codes. The bar codes can be read by a bar code reader. As another example, a portion of the transaction information on display 44 may be graphics.

FIG. 5B is an illustration depicting an exemplary display 35 on a mobile communication device 30, in accordance with an embodiment of the disclosure. Display 35 includes a portion of the transaction information sent from the exemplary access device 42 in FIG. 5A. Display 35 includes the list of four items, the prices associated with each item, and the total amount of the transaction. Display 35 also includes a request for a PIN number. In this embodiment, payment processing network 60 requires that consumer 20 enter a PIN before the transmission of the transaction information shown on display 35 will be received by payment processing network 60.

VII. Computer Apparatuses

Figure 6:
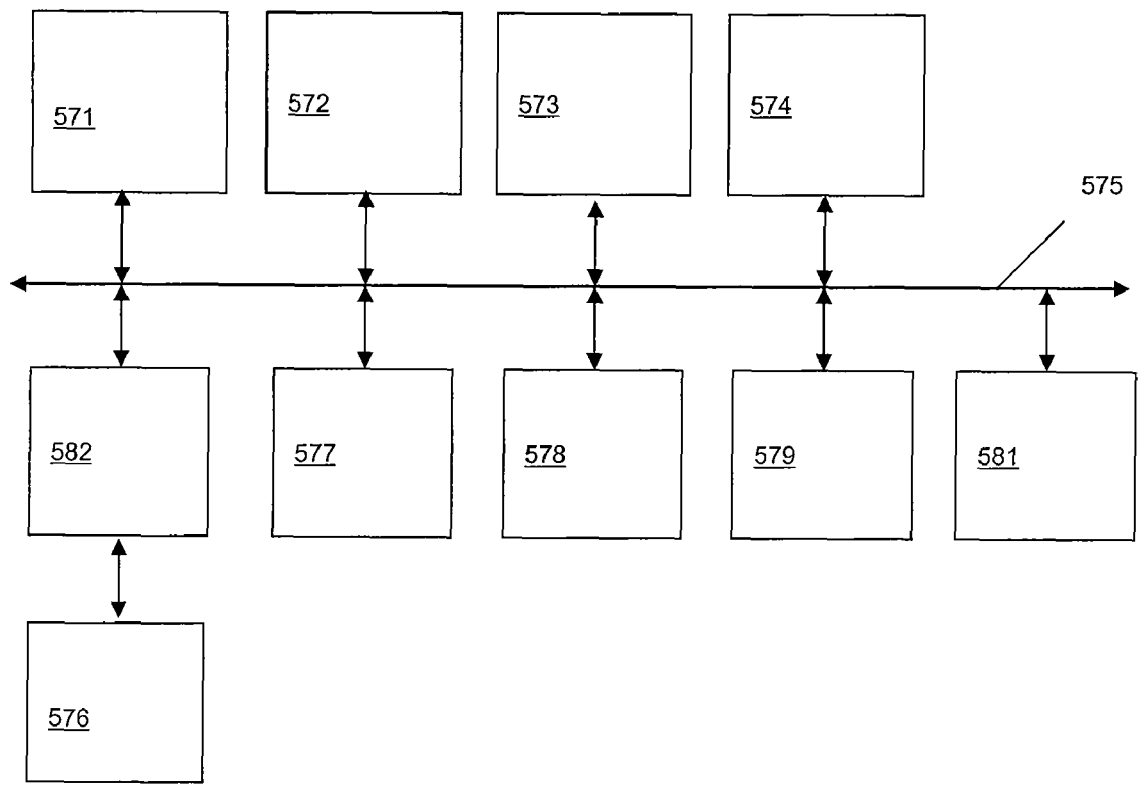
FIG. 6 shows a block diagram of subsystems that may be present in computer apparatuses that are used in system, according to embodiments of the invention.

FIG. 6 shows a block diagram of subsystems that may be present in computer apparatuses that are used in system 10, according to embodiments of the invention. For example, server computers 60(a) and 70(a) may use any suitable combination of components in FIG. 6.

The various participants and elements in the previously described Figures may operate using one or more computer apparatuses to facilitate the functions described herein. Any of the elements in the Figures may use any suitable number of subsystems to facilitate the functions described herein. Examples of such subsystems or components are shown in a FIG. 6. The subsystems shown in FIG. 6 are interconnected via a system bus 575. Additional subsystems such as a printer 574, keyboard 578, fixed disk 579 (or other memory comprising computer readable media), monitor 576, which is coupled to display adapter 582, and others are shown. Peripherals and input/output (I/O) devices, which couple to I/O controller 571, can be connected to the computer system by any number of means known in the art, such as serial port 577. For example, serial port 577 or external interface 581 can be used to connect the computer apparatus to a wide area network such as the Internet, a mouse input device, or a scanner. The interconnection via system bus allows the central processor 573 to communicate with each subsystem and to control the execution of instructions from system memory 572 or the fixed disk 579, as well as the exchange of information between subsystems. The system memory 572 and/or the fixed disk 579 may embody a computer readable medium. Any of these elements may be present in the previously described features. For example, the previously described directory server and access control server may have one or more of these components shown in FIG. 6.

A computer readable medium according to an embodiment of the invention may comprise code for performing any of the functions described above. For example, the previously described server computers 60(a), 70(b) may comprise a computer readable medium comprising code for receiving transaction information associated with a transaction from a mobile communication device, wherein the mobile communication device received the transaction information from a merchant; and code for sending the transaction information to an issuer associated with the mobile communication device.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

All patents, patent applications, publications, and descriptions mentioned above are herein incorporated by reference in their entirety for all purposes. None is admitted to be prior art.

What is claimed is:

1. A method comprising:
 receiving transaction information associated with a transaction at a mobile communication device from a merchant; and
 sending the transaction information from the mobile communication device to an issuer associated with the mobile communication device, wherein sending the transaction information from the mobile communication device to the issuer includes sending the transaction information to a payment processing network, wherein the payment processing network, not the merchant network, generates an authorization request message including at least some of the transaction information and sends the authorization request message to the issuer, wherein the issuer thereafter sends an authorization response message to the merchant.

2. The method of claim 1, further comprising:
 receiving a PIN from a consumer; and
 in response to receiving the PIN, sending a request to the merchant for the transaction information.

3. The method of claim 1, wherein the merchant is an e-commerce business.

4. The method of claim 1, wherein receiving transaction information associated with the transaction comprises reading the transaction information from a display on an access device using a camera.

5. A non-transitory computer readable medium, comprising code, executable by a processor, for implementing a method comprising:
receiving transaction information associated with a transaction at a mobile communication device from an access device at a merchant; and
sending the transaction information from the mobile communication device to an issuer associated with the mobile communication device, wherein the sending the transaction information from the mobile communication device to the issuer includes sending the transaction information to a payment processing network, wherein the payment processing network, not the merchant network, generates an authorization request message including at least some of the transaction information and sends the authorization request message to the issuer, wherein the issuer thereafter sends an authorization response message to the merchant.

6. A phone, comprising:
a computer readable medium comprising code, executable by a processor, for implementing a method comprising
receiving transaction information associated with a transaction from a merchant and sending the transaction information to an issuer associated with the mobile communication device, wherein sending the transaction information from the mobile communication device to the issuer includes sending the transaction information to a payment processing network, wherein the payment processing network, not the merchant network, generates an authorization request message including at least some of the transaction information and sends the authorization request message to the issuer, wherein the issuer thereafter sends an authorization response message to the merchant; and
the processor in communication with the computer readable medium.

7. The phone of claim 6, further comprising a display showing at least some of the transaction information.

8. A method comprising:
receiving transaction information associated with a transaction from a mobile communication device, wherein the mobile communication device received the transaction information from a merchant;
sending the transaction information to an issuer associated with the mobile communication device, wherein sending the transaction information to the issuer includes sending the transaction information to a payment processing network, wherein the payment processing network, not the merchant network, generates an authorization request message including at least some of the transaction information and sends the authorization request message to the issuer; receiving an authorization response message from the issuer; and
sending the authorization response message to the merchant.

9. The method of claim 8, further comprising:
receiving a PIN from a consumer; and
in response to receiving the PIN, sending a request from the mobile communication device to the merchant for the transaction information.

10. The method of claim 8, wherein the merchant is an e-commerce business.

11. The method of claim 8, wherein the mobile communication device received the transaction information associated with the transaction by reading the transaction information from a display on an access device using a camera.

12. A non-transitory computer readable medium, comprising code, executable by a processor, for implementing a method comprising:
receiving transaction information associated with a transaction from a mobile communication device, wherein the mobile communication device received the transaction information from a merchant;
sending the transaction information to an issuer associated with the mobile communication device, wherein sending the transaction information to the issuer includes sending the transaction information to a payment processing network, wherein the payment processing network, not the merchant network, generates an authorization request message including at least some of the transaction information and sends the authorization request message to the issuer; receiving an authorization response message from the issuer; and sending the authorization response message to the merchant.

13. A server computer comprising a non-transitory computer readable medium comprising code, executable by a processor, for implementing a method comprising:
receiving transaction information associated with a transaction from a mobile communication device, wherein the mobile communication device received the transaction information from a merchant;
sending the transaction information to an issuer associated with the mobile communication device, wherein the sending the transaction information to the issuer includes sending the transaction information to a payment processing network, wherein the payment processing network, not the merchant network, generates an authorization request message including at least some of the transaction information and sends the authorization request message to the issuer; receiving an authorization response message from the issuer; and sending the authorization response message to the merchant.

14. A method comprising:
receiving transaction information associated with a transaction at a mobile communication device from a merchant;
translating the transaction information into a form that is compatible with a payment processing network, wherein the payment processing network, not the merchant network, is in communication with an issuer; and
sending the translated transaction information from the mobile communication device to the payment processing network, wherein the issuer thereafter sends an authorization response message to the merchant.

15. The method of claim 14, further comprising:
receiving a PIN from a consumer; and
in response to receiving the PIN, sending a request to the merchant for the transaction information.

16. The method of claim 14, wherein the merchant is an e-commerce business.

17. The method of claim 14, wherein receiving transaction information associated with the transaction comprises reading the transaction information from a display on an access device using a camera.

18. A non-transitory computer readable medium, comprising code, executable by a processor, for implementing a method comprising:

receiving transaction information associated with a transaction at a mobile communication device from a merchant;

translating the transaction information into a form that is compatible with a payment processing network, wherein the payment processing network, not the merchant network, is in communication with an issuer; and sending the translated transaction information from the mobile communication device to the payment processing network, wherein the issuer thereafter sends an authorization response message to the merchant.

19. A phone, comprising: a processor;

a computer readable medium comprising code executable by the processor, for implementing a method comprising receiving transaction information associated with a transaction at a mobile communication device from a merchant, translating the transaction information into a form that is compatible with a payment processing network, wherein the payment processing network, not the merchant network, is in communication with an issuer, and sending the translated transaction information to the payment processing network, wherein the issuer thereafter sends an authorization response message to the merchant.

20. The phone of claim 19, further comprising a display showing at least some of the transaction information coupled to the processor.

21. The method of claim 1, wherein the issuer sends an authorization response message to the merchant.

22. The method of claim 21, wherein the sending of transaction information to the issuer from the mobile communication device uses SMS or MMS.

23. The method of claim 21, wherein the merchant displays the authorization response message on a display of an access device.

24. The method of claim 1, wherein an account is linked to a phone number associated with the mobile communication device.

25. The phone of claim 6, further comprising:

sending account information to the issuer, wherein the account information identifies an account associated with a consumer at the issuer and wherein the phone does not send account information to the merchant.

* * * * *